Jan. 18, 1938.  O. A. LABUS ET AL  2,106,101
AIR CONDITIONING SYSTEM
Original Filed Nov. 16, 1928   5 Sheets—Sheet 4

Inventors:
Otto A. Labus
Robert B. Crawford
By Brown, Jackson, Boettcher & Drenner
Attys.

Patented Jan. 18, 1938

2,106,101

UNITED STATES PATENT OFFICE

2,106,101

AIR CONDITIONING SYSTEM

Otto A. Labus, Wisconsin Rapids, Wis., and Robert B. P. Crawford, Chicago, Ill., assignors, by direct and mesne assignments, to Frick Company, Waynesboro, Pa., a corporation of Pennsylvania Application November 16, 1928, Serial No. 319,764
Renewed December 11, 1933

13 Claims. (Cl. 236—44)

The present invention relates to air conditioning systems, such as are employed for conditioning the air circulated in theatres, assembly rooms, schools and other enclosures usually occupied by persons in considerable numbers. While such represents the most general utility of the invention, it will be understood that the system is also capable of adaptation to industrial uses, as for conditioning air which is circulated in contact with different materials or which is employed in different process operations.

One of the principal objects of the invention is to provide an improved method of controlling the humidity of the air by sensing or determining the dew-point of the conditioned air, and using this as a governing factor for regulating the operation of the air conditioning apparatus. With air at a given dry bulb temperature, a relatively high dew-point temperature corresponds to a relatively high humidity or degree of saturation, and a relatively low dew-point temperature corresponds to a relatively low humidity or degree of saturation. The dew-point thus affords an accurate indication of the absolute humidity of the conditioned air, and in the present system this dew-point sensing is employed to regulate the operation of the air conditioning apparatus.

Another object of the invention is to provide an improved method of conditioning air which comprises taking this dew-point temperature as one governing factor, and taking the dry bulb temperature as the other governing factor and having these two factors operate differentially to control the treatment of the air as such treatment is effected by the conditioning apparatus. By virtue of the differential relation which exists between these two temperatures, in the exercise of their control over the air conditioning apparatus, it is possible to maintain a substantially constant balance or differential relation between the dew-point and dry bulb temperature of the air, or, otherwise expressed, to maintain a substantially constant relative humidity of a certain desired value.

While the maintenance of a substantially constant relative humidity represents the operating condition which is most desirable and which is most usually followed in summer seasons, the invention also contemplates an operating condition wherein a fixed absolute humidity is maintained, although the percentage degree of unsaturation during such operating condition may vary from day to day. The above described control mechanism, comprising the instrument which senses the dew-point and the instrument which senses the dry bulb temperature, may be employed in conjunction with various types and constructions of air conditioning apparatus to the end of obtaining the above mentioned operating conditions. That is to say, within the broader aspects of the invention, the air conditioning apparatus which is responsive to this control mechanism may be of any desired type suitable to the performance of the necessary air conditioning operations, comprising, for example, a dehumidifying chamber containing spray nozzles and refrigerating coils operating in conjunction with a by-pass for regulating the proportion of air passing through said dehumidifying chamber under the control exercised by said control mechanism, or comprising two spray chambers operating under different water temperatures and arranged to have the volumes of air passing through said chambers proportioned by said control mechanism. In the preferred embodiment, however, we employ a dehumidifying spray chamber which is shunted by a by-pass, with a damper regulating the proportion of the air streams passing through said dehumidifying chamber and through said by-pass, under the differential control of the dew-point and the dry bulb temperature, as above described.

Such preferred embodiment of air conditioning apparatus also comprises means for governing the spray discharge and for governing the amount of water sluicing down across the refrigerator coils, under the control of the dew-point sensing instrument.

Another object of the invention is to provide an improved construction of dew-point sensing and controlling instrument. Such instrument, which we have termed a "diffostat", is capable of sensing the dew-point in any mixture of air and water vapor, whether saturated or unsaturated. The air stream from the dehumidifying chamber and the air stream from the by-pass are intimately mixed in the conditioning apparatus and in one embodiment of the dew-point sensing instrument a portion of this mixed air is brought into contact with a relatively cool surface in said instrument for effecting a condensation of some of the vapor content of the mixed air. Such condensate or dew accumulates in a receptacle where it acts on a thermostatic element, the latter responding to the dew-point or temperature of the condensation and exercising its control function on the air conditioning apparatus. The cooling or condensing surface is maintained cool by the circulation of a coolant in heat absorbing relation thereto. In another embodiment of the instrument the heat transfer incident to the condensation of dew on the cooling surface and incident to the transfer of the dry heat of the air to said cooling surface is utilized to raise the temperature of this coolant to the dew-point temperature, which latter temperature is then sensed by the thermostatic element as the dew-point of the conditioned air. As previously remarked, when the absolute humidity is high the dew-point is relatively high, and conversely when the absolute humidity is low the dew-point is low, and hence the temperature sensing of the thermostatic element is an accurate indication of the dew-point or absolute humidity of the conditioned air.

Other objects and advantages of the invention will appear at length in the following description of a preferred embodiment of the system. In the accompanying drawings illustrating such embodiment.

Figure 1:
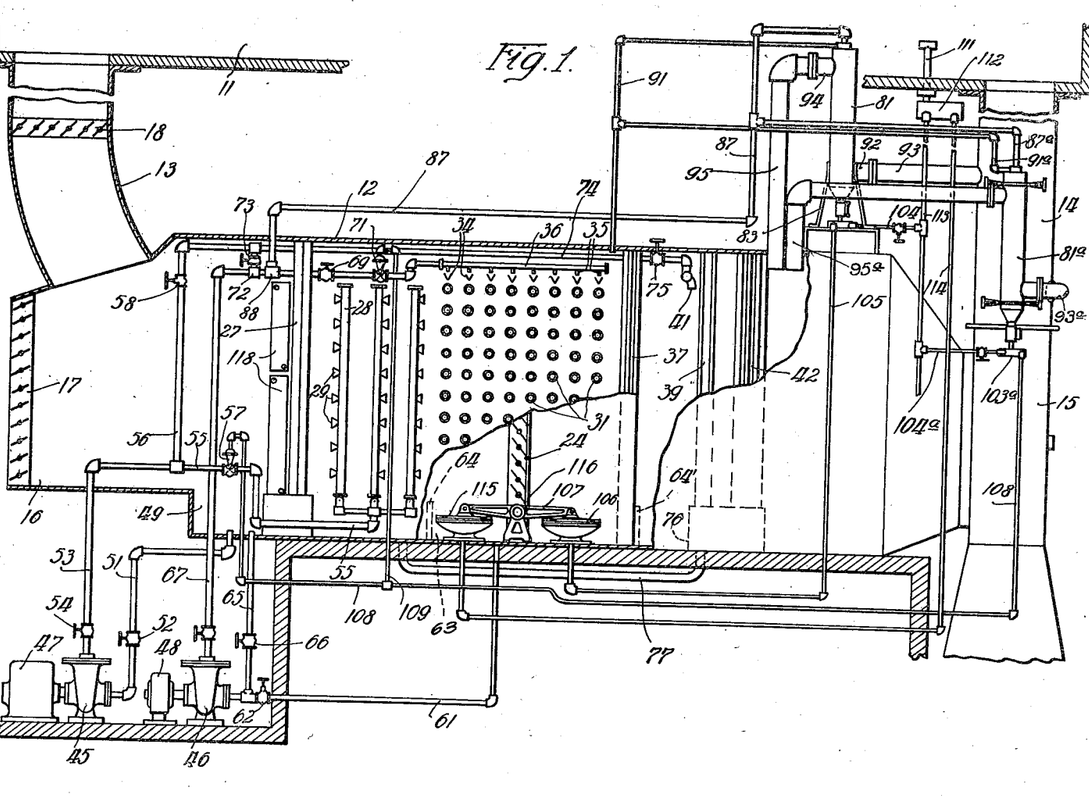
Figure 1 is a diagrammatic side view of the air conditioning apparatus, partly in section and partly in elevation, illustrating the manner in which the control functions are obtained.

The theatre, room or other enclosure, through which the conditioned air is to be circulated, is diagrammatically indicated at 11 in Fig. 1. The air conditioning apparatus is enclosed in an elongated casing 12 which communicates with the enclosure 11 through the ducts 13 and 14.

The return air from the enclosure is conveyed to the casing 12 through the duct 13, and after passing through the conditioning apparatus within said casing discharges from the outlet end thereof into a fan or blower 15 which circulates the conditioned air through the duct 14 back into the enclosure 11. Connecting with the inlet end of the casing 12 is a fresh air intake 16 communicating with the outside atmosphere and regulated by a suitable damper 17. Such damper may be thermostatically controlled or manually controlled, as desired. The return air duct 13 is also preferably provided with a suitable damper 18, which may be either thermostatically or manually controlled. The intermediate lower portion of the casing 12 is depressed or is otherwise constructed to form the sumps or collecting receptacles for receiving the water from the spray heads, refrigerator coils, etc.

Figure 2:
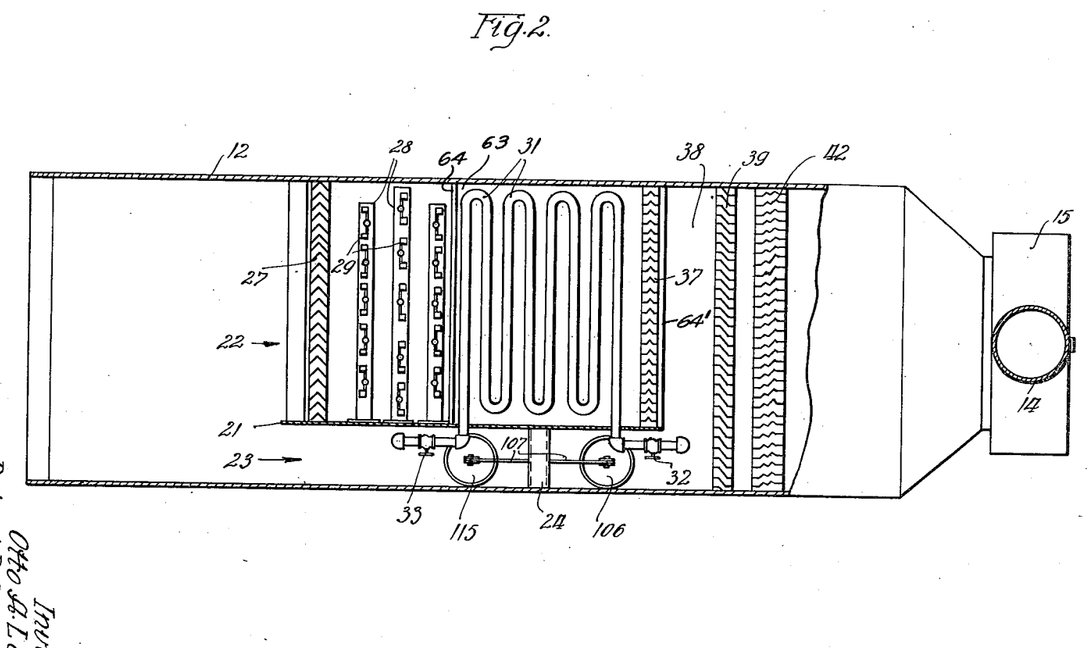
Figure 2 is a horizontal sectional view through the air-conditioning apparatus.

Referring to Fig. 2, it will be seen that the interior of the casing 12 is divided vertically by an upright partition 21, into a spray chamber or dehumidifying passageway 22, and a by-pass chamber or passageway 23 through which a portion of the air can be shunted around the dehumidifying chamber 22 in controlling the air conditioning operation. The volume of air flowing through the dehumidifying chamber 22 may be proportioned to the volume of air flowing through the by-pass 23 by a combination of inversely operating dampers, with both dampers arranged whereby when the damper associated with the by-pass is moved toward open position the damper associated with the spray chamber is moved toward closed position, and vice versa.

However, owing to the appreciable resistance to flow through the dehumidifying chamber 22 created by the spray heads, refrigerator coils and eliminators, the desired proportioning of the two air streams can be effected solely by damper mechanism controlling the flow through the by-pass 23, and in the present embodiment we have illustrated this simpler construction. The single damper mechanism controlling said by-pass is preferably in the form of a louvre damper 24 which is controlled by motor mechanism differentially responsive to a dew-point and dry bulb temperature, as will be hereinafter described.

Referring now to the apparatus which is contained within the conditioning chamber 22, the air stream passing through said chamber first encounters a series of baffles 27 which are designed to prevent the spray water from being projected out of the spray chamber. After passing through these baffles the air stream enters the spray chamber proper, in which are disposed a plurality of banks of spray stands or headers 28 carrying nozzles 29 from which a mist-like spray is discharged. In the preferred arrangement, one or more banks of spray headers project their discharge in a direction against the air flow, the baffles 27 preventing such discharge from being projected out of the spray chamber, and the other banks or headers project their discharge in a direction with the flow of air. Each bank is usually provided with a separate control valve by which one or more banks can be cut out of operation, when desired.

From this spray area the air stream next passes over refrigerating coils 31 which are suitably grouped in banks or tiers to present a large surface area to the air. It will be understood that any suitable refrigerant is circulated through these coils from a refrigerating machine, the two valves 32 and 33 shown in Figure 2 being representative of the usual expansion and stop valves associated with the coils. The surfaces of the coils are maintained wet by sluicing water over the same from overhead drip or spray troughs 34 which receive water from nozzle outlets 35 opening from the bottom of one or more supply pipes 36. It will be understood that the water which is sluiced down over the refrigerating coils functions as a heat transfer medium between the air stream and the coils so as to reduce the temperature of the air quickly within the limits of conditioning apparatus of reasonable size. The refrigerating coils must be maintained at a considerably lower temperature than the air because all of the air does not contact with the coils and that portion of the air which does so contact must be chilled considerably below the ultimate desired temperature in order that the average temperature of the entire air stream passing through the chamber 22 will be at this desired temperature. This reduction in temperature of the air results in the air tending to deposit its moisture upon the coils and in the water or coolant which is sluiced down over the coils, thereby obtaining the desired dehumidification of the air stream passing through the chamber 22.

It will also be understood that the refrigerating coils serve to maintain the liquid coolant at the desired low temperature, which liquid coolant is employed in the dew-point sensing instrument or "diffostat" for effecting condensation of the vapor in the conditioned air, as will hereinafter appear.

From the refrigerator coils 31 the air stream thence passes through a series of eliminator baffles 37 which prevent the spray and sluicing coolant from passing out of the spray chamber, and which also remove from the air stream all free water not constituting a part of the true vapor content of the air. After passing through these eliminator baffles, the dehumidified air stream enters a space 38 which may be termed a mixing chamber, and at which point such air stream is mixed with the air stream which has been passed through the by-pass chamber 23. If desired, any suitable deflecting baffle or baffles may be provided for deflecting the two air streams toward each other for intimate commingling of the air. Under usual operating conditions, the by-passed air is of relatively high dry bulb temperature and dew-point, whereas the dehumidified air is of relatively low dry bulb temperature, usually lower in fact than the dew-point of the by-passed air. Consequently, under these conditions, the admixture of the two air streams results in a condensation of moisture from the mixed air. This mixed air is passed through a series of baffles 39 which may be either one of two types of baffles.

For example, such baffles may be constructed in the form of drip baffles for eliminating the condensate which has resulted from the admixture of the dehumidified air of low dry bulb temperature with the shunted air of relatively high dew-point. As an alternative arrangement, the baffles 39 may be constructed and arranged for the performance of a scrubbing operation on the mixed air. In such case, water is discharged down over the front face of the baffles from one or more discharge troughs or nozzles 41, such discharge being in a non-atomized or sheet form for removing dirt and dust particles from the air. In such instance where the baffles 39 serve as scrubbing baffles it is desirable to provide a second series of baffles 42 at a point beyond the baffles 39 for eliminating the condensed and unvaporized water from the mixed air. The conditioned air thereupon passes from the discharge end of the casing 12 to the fan 15 from whence it is conveyed through the duct 14 to the enclosure 11, being still further mixed in passing through the fan.

We shall now describe the circulating system for the spray water, sluicing water, etc., which circulating system embodies certain improvements for obtaining a more economical operation of the apparatus in the winter. The spray water which is discharged from the spray stands 28 is preferably handled by one pump 45, and the liquid coolant which is sluiced down over the refrigerating coils 31 is preferably handled by a separate pump 46. To obtain a finely atomized mist in the discharge of the water from the spray nozzles 29, the pump 45 must operate under a considerable head, and accordingly this pump is driven by a comparatively large motor 47.

The head imposed on the other pump 46 is much lighter and, accordingly this pump can be driven by a smaller motor 48. In the winter season when the refrigerating coils 31 are not functioning, the pump 46 can supply the spray heads 28 to the exclusion of the pump 45, through a cross connecting arrangement of piping which we shall now describe. The bulk of the spray water discharged from the spray heads accumulates in a sump 49 at the intake end of the casing 12. A pipe 51 leads from this sump down to the intake port of the pump 45, having a control valve 52 interposed therein. A discharge pipe 53 leading from the outlet port of the pump and having a control valve 54 interposed therein, communicates with two branch pipes 55 and 56. The branch pipe 55 extends to the several banks of spray heads 28 for supplying water to all of the spray nozzles 29. As previously remarked, one or more banks of these spray devices can be cut into or out of operation by individual control valves for the several banks. A master control valve 57 is interposed in the branch pipe 55 for controlling the total quantity of water supplied to the spray nozzles. Such valve functions as an automatic spray regulating element, being electrically or pneumatically controlled under the regulating influence of a dew-point sensing instrument, as will be later described. The other branch pipe 56 has an individual manually controlled valve 58 therein and is arranged to have cross-connection with the pipe which supplies the sluicing water to the refrigerator coils. This branch pipe 56 may also supply scrubbing water to the baffles 39.

The other pump 46 receives the liquid coolant sluiced down over the refrigerating coils through a pipe 61 having a manually operated valve 62 therein. This pipe opens into a sump 63 located directly below the refrigerating coils. Preferably this sump is separated from the spray water sump 49 by partition walls 64—64' which are made sufficiently low, or which are provided with weir openings, so that overflow can occur from one sump to the other. The inlet of the pump 46 may also be arranged for communication with the sump 49 through a pipe 65 having a manually operated valve 66 therein. The discharge from pump 46 is conveyed through pipe 67 to the spray pipe 36, which discharges the water into the spray troughs 34 for sluicing down over the refrigerator coils. A manually controlled valve 69 and an automatic regulating valve 71 are interposed in the pipe 67. The latter valve is electrically or pneumatically operated under the controlling influence of a dew-point sensing instrument, similarly to the valve 57, whereby said valve 71 controls the quantity of coolant sprayed over the refrigerating coils. A cross connection 72 is established between the discharge pipe 67 leading from the pump 46 and the branch discharge pipe 56 leading from the pump 45, such cross connection being controlled by a valve 73. In the winter when the refrigerating coils 31 are not functioning, the low pressure pump 46 may be employed to supply the spray water to the spray headers 28, such being accomplished by closing valves 54 and 69 and opening the cross connection valve 73, whereby the water from the pump 46 will be conveyed through said cross connection and through the branch discharge pipes 56 and 55, to the spray headers.

When operating in this relation the valve 66 is opened so that the water in the sump 49 will be returned to the pump 46. A decided economy in operation can be gained by this ability to discontinue the operation of the pump 45 and to supply all of the spray water through the pump 46 having the smaller motor 48.

When the baffles 39 are to have a scrubbing function the scrubbing water discharged from the outlet members or nozzles 41 is supplied through a pipe 74 which is connected to receive its supply from the branch pipe 56 or from the pipe 67. The pipe 74 has a valve 75 interposed therein for controlling the discharge of scrubbing water. This scrubbing water, together with the condensate precipitated from the eliminator baffles 42, accumulates in a sump 76 which is preferably connected with the spray water sump 49 through a suitable conduit 77 so that the water from both sumps will be returned to the pump 45.

Figure 3:
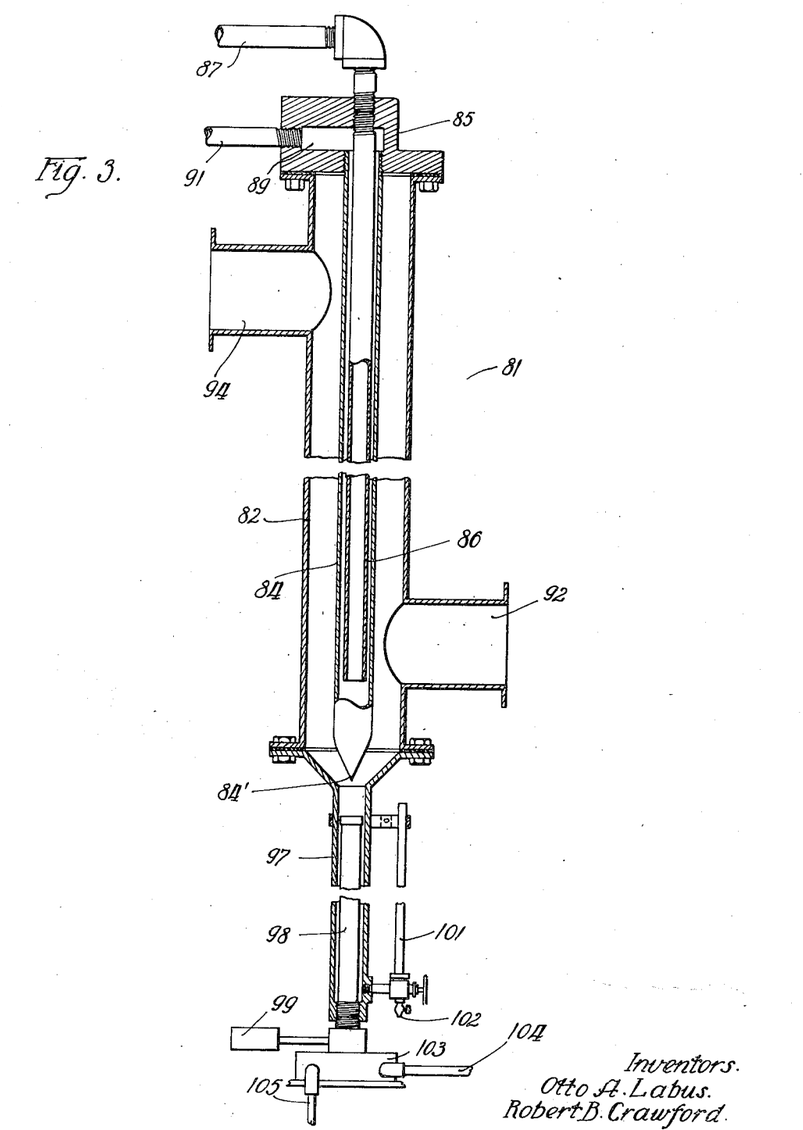
Figure 3 is an enlarged vertical sectional view through one form of the dew-point sensing instrument or "diffostat"

Referring now to one form of the instrument which senses the dew-point or equivalent vapor pressure of the mixed air, such instrument, which is designated 81 in its entirety, is preferably mounted on or in proximity to the casing 12, so that it may derive its cooling liquid from the water circulating system of the conditioning chamber, although it will be evident that this instrument may be located at any other point in the air circulating system, if desired. Referring to Fig. 3, such instrument comprises an upright tubular shell 82 which is supported at its lower end in any suitable frame 83 (Fig. 1) mounted on the casing 12 or other suitable support. Extending down into the tubular shell 82 is a condensing tube 84 through which the cooling liquid is circulated. The upper end of said tube threads into a cap 85 which closes the top of the tubular casing 82.

An inner circulating tube 86 passes through the cap 85 and extends down into the condensing tube 84 to a point adjacent to the lower end thereof. The upper end of the circulating tube 86 connects with a pipe 87 which leads to one of the water circulating pipes of the air conditioning apparatus whereby relatively cool water is continuously supplied to the dew-point sensing instrument. Preferably the pipe 87 communicates through a T connection 88 with the pipe 67 which discharges liquid coolant to the refrigerating coils 31, whereby the relatively low temperature of this coolant is made available for chilling the dew-point instrument, the T connection 88 being disposed on the pump side of the valve 69 so that cooling liquid will be supplied to the dew-point instrument even when the sluicing discharge of the coolant down over the coils 31 has been interrupted. The upper end of the outer circulating or condensing tube 84 communicates through a chamber 89 in the head 85 with a return pipe 91 which leads back to the casing 12 and discharges therein, preferably at a point over the intermediate sump 63 which is located below the refrigerating coils. It will thus be seen that during the operation of the system a portion of the relatively cool water which is sluiced over the refrigerating coils is continuously circulated through the condensing tube 84 of the dew-point sensing instrument. This maintains the temperature of said tube at a point slightly below the dew-point of the conditioned air.

A quantity of the conditioned air is continuously circulated through the tubular shell 82 so as to bring about a condensation of the vapor content of said air upon the condensing tube 84. An air intake port 92 communicating with the lower end of the tubular casing 82 has connection through a pipe 93 with the air discharge duct 14. An outlet port 94 leading from the upper portion of the tubular casing 82 connects with a pipe 95 which opens into the main casing 12, preferably at a point beyond the eliminator baffles 42. The pressure created in the duct 14 by the fan 15 results in a continuous circulation of the conditioned air through the tubular chamber 82. This air in impinging against the relatively cool outer surface of the condensing tube 84 will have its temperature lowered to the point where its vapor content will condense in dew form on the outer surface of the tube. Such outer surface is preferably highly polished to augment this condensation. The dew will travel downwardly along the tube 84 and will drip off the pointed lower end 84' thereof into the flared upper end of a well 97 which is connected to the lower end of the tubular chamber 82. The dew accumulating in the well 97 is effective on a thermostat, which may be either of the liquid type or of the bi-metallic type. We have shown a thermostat of the liquid type, comprising a tube 98 which screws into the lower end of the well, with the tube extending to a considerable height up into the well so that a large area thereof will be in direct contact with the accumulation of dew. A gauge 99 connects with the thermostat for indicating the temperature of the dew, and a capillary sight glass 101 communicates with the well 97 for indicating the depth of immersion of the thermostatic tube 98 in the dew.

A cock 102 at the lower end of the sight glass 101 provides for a continuous predetermined drainage of the dew from the well 97. If desired, a flow meter can be connected with the drain cock 102 for the purpose of indicating the volume or weight of the dew accumulating in the well and thereby affording an indication of the rate of condensation of vapor from the conditioned air, and a measure of the dehumidifying refrigeration load. The thermostat comprises a hollow base 103 in which is housed a suitable regulating element responsive to the dew-point sensing as determined by the thermostat. When the control system is of the pneumatically operating type, such regulating element will consist of a valve operatively associated with the thermostat in such a manner that the valve will be opened and closed by variations of the dew point. When the control system is electrical in its operation, the regulating element in the base 103 will consist either of a switch or a rheostat which is operative to open and close an electrical circuit, or to vary the resistance thereof, in accordance with the change in dew-point temperature. Such regulating elements, either of the pneumatic or electrical type, are well known and need not be described in detail. In the embodiment illustrated we have employed a pneumatic control system, and in such embodiment the regulating valve device in the base 103 will be supplied with compressed air through a pipe 104 leading from any suitable source of air pressure. The outlet from the valve device is connected with a pipe 105 leading to a pneumatic motor element 106 which controls the by-pass damper 24. Said motor element preferably consists of a diaphragm chamber having a flexible diaphragm which is operatively connected to a rocking lever 107, which in turn is operatively connected with the louvre damper 24.

Another dew-point sensing device 81a, which may be a duplicate of the aforementioned sensing device 81, is employed to govern the two automatic regulating valves 57 and 71 which control the supply of spray water and of sluicing water, as previously described. This latter sensing device also has a quantity of the conditioned air continuously circulated therethrough, conducted from the air discharge duct 14 through conduit 93a to the intake port of the instrument and from the outlet port thereof through conduit 95a back to the main casing 12. A supply of liquid coolant is also circulated through the condensing tube of the latter instrument, being established through pipes 87a and 91a which connect with the inlet and outlet ports of the condensing tube and extend to the pipes 87 and 91 which circulate coolant through the first dew-point sensing device 81. The valve element 103a of the second sensing device 81a has connection with a source of air supply through a pipe 104a and has its outlet connected with a pipe 108 from which branches a pipe 109, these two pipes leading respectively to the two automatic control valves 57 and 71. When the control system is pneumatic in its operation each of these control valves comprises a diaphragm chamber with the diaphragm thereof so connected with the valve element that the subjection of the diaphragm to air pressure or to an increased air pressure through the aforementioned pipe line operates to close the valve, or to variably restrict the valve port therein in accordance with varying air pressures.

In the majority of these pneumatic control systems a calibrated bleeder vent is usually associated with the control valve or air line leading therefrom, and it will be understood that such restricted bleeder vent is associated with the air control line leading to the pneumatic motor 106, and is also associated with the air control lines leading to the two automatic valves 57 and 71, so that the control valves can effect a variable regulation of air pressure.

It will be seen from the foregoing that the supply of spray water and sluicing water in the conditioning chamber can be made responsive to the dew-point sensing of the conditioned air. Preferably, the valve 103a of the second sensing device 81a has a slightly lower setting or calibrated adjustment than the valve 103 of the first sensing device 81 so that when the dew-point temperature of the conditioned air continues to drop beyond the lower limit of the first sensing device 81 the second sensing device 81a will thereupon respond and operate to restrict or close the automatic valves 57 and 71 for shutting down on the spray water and sluicing water. This dew-point control over the spray water and sluicing water enables a fixed absolute humidity to be maintained, and prevents the temperature from dropping down beyond a predetermined lower limit. If the scrubbing water pipe line 74 is connected to receive its supply from the sluicing water pipe line 67 it is connected thereto on the pump side of the valves 69 and 71 so that operation of the automatic valve 71 to cut down the supply of sluicing water will merely divert more water to the scrubbing baffles, and so that closing of the manual valve 69 in the winter will still permit the supply of scrubbing water to these baffles.

The dry bulb temperature of the conditioned air is sensed by a thermostat 111 which is located at any preferred point in the air circulating system, preferably in the enclosure 11, although such thermostat may be located in one of the ducts 13 or 14, if desired. This thermostat also comprises a casing 112 in which is housed a suitable valve device which is responsive to changes of temperature as sensed by the dry bulb thermostat. Compressed air is conveyed to this valve device through a pipe 113 which also connects with any suitable source of compressed air along with the pipes 104 and 104a. A control line 114 leads from the valve device to a pneumatic motor 115 which is arranged to act in opposition to the pneumatic motor 106, for controlling the position of the by-pass damper 24, it being understood that a restricted atmospheric vent is also associated with this air control line, as described of the other air control line 105.

As illustrative of one method of obtaining the desired differential relation between the dew-point sensing and the dry bulb temperature, the two pneumatic motors 106 and 115 are operatively connected to the opposite ends of the centrally pivoted rocker arm or lever 107 so that both motors act in opposition to each other.

The rocking movement of said arm is transmitted to the by-pass damper 24 through suitable links 116 so that any differential operation of the two pneumatic motors 106 and 115 will effect closing or opening movement of the damper. The operating arrangement of the control system is such that as the dew-point temperature sensed in the diffostat 81 rises, increased air pressure is admitted through the control line 105 for operating the pneumatic motor 106 in a direction to overcome the opposing motor 115 and open the by-pass damper 24 to a greater degree. The basis of this operating relation wherein the by-pass damper is opened for a relative rise in the dew-point and is closed for a relative fall in dew-point resides in the fact that the cooling coils 31 function with a fixed refrigerating capacity. Referring now to the other governing factor of the conditioned air, when the dry bulb temperature as sensed by the thermostatic element 111 increases, as a result of change of conditions, the operating arrangement is such that increased air pressure is admitted to the control line 114 for energizing the other pneumatic motor 115 for motion in a direction opposing the motion of the pneumatic motor 106, i. e., the operation of the pneumatic motor 115 tends to close the by-pass damper 24.

It will thus be seen that the general operation of the system is based upon the maintenance of a substantially fixed differential or balanced relation between the sensing determined by the dew-point instrument 81 and the sensing determined by the dry bulb thermostat 111. If the dew-point and the dry bulb temperature rise together, with the predetermined differential substantially maintained between these two temperatures, the two pneumatic motors 106 and 115 will be energized to equal amounts or under equal pressures so that there will be no change in the position of the by-pass damper 24. Similarly, if the dew-point and dry bulb temperature of the conditioned air should go down together, while maintaining a substantially fixed differential therebetween, the response of the two motor elements 106 and 115 will be the same and hence there will be no movement of the by-pass damper 24 under this condition. However, if the dew-point should rise independently of, or without a corresponding rise of, the dry bulb temperature, the pneumatic motor 106 will be energized to a greater degree than the other motor 115, with the result that the by-pass damper will be opened to a greater degree for increasing the proportion of the air flowing through the by-pass. Conversely, if the dry bulb temperature of the conditioned air should rise without a proportionate rise in the dew-point thereof, the other control motor 115 will be energized to a preponderating degree for closing the by-pass, or diminishing the flow therethrough, and thereby increasing the proportionate volume of air passing through the conditioning chamber.

When operating the system under cold weather conditions, the supply of refrigerant to the refrigerating coils is discontinued, and any suitable means may be employed for tempering or heating the air. For example, steam may be admitted to these refrigerating coils or to separate heaters 118 disposed at the intake end of the spray chamber, or steam may be mixed with the spray water for maintaining the latter at a higher temperature.

Figure 4:
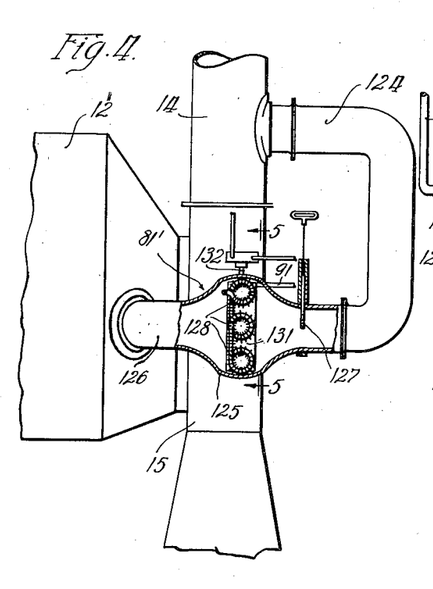
Figure 4 is a fragmentary view of the discharge end of the conditioning apparatus, illustrating another form of dew-point sensing instrument.
Figure 5:
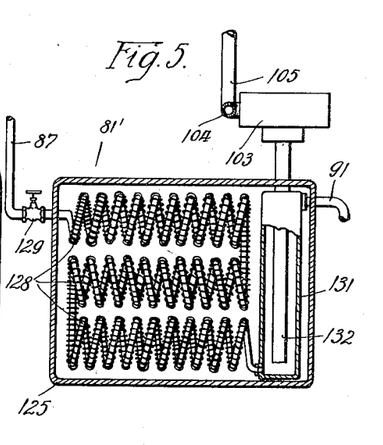
Figure 5 is a vertical sectional view through this embodiment of the dew-point sensing instrument taken approximately on the plane of the line 5—5 of Figure 4.
Figure 6:
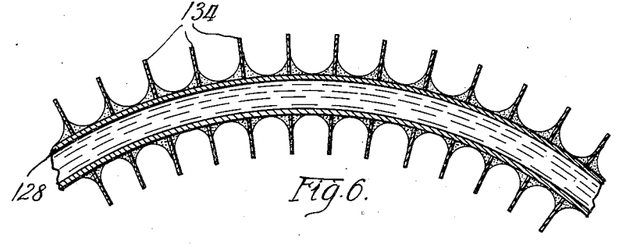
Figure 6 is an enlarged fragmentary sectional view through the finned coil of such instrument.

In Figures 4, 5 and 6 we have illustrated a modified construction of dew-point sensing device, designated 81' in its entirety. An air conduit 124 leads from the air discharge duct 14 on the outlet side of the circulating fan 15 to a chamber 125. From this chamber a return duct 126 extends into the main casing 12 at the inlet side of the fan. The pressure created in the discharge duct 14 by the fan 15 results in the continuous circulation of the conditioned air through the conduit 124, chamber 125, and return conduit 126 back into the casing 12. The volume of conditioned air thus circulated through the chamber 125 is regulated by a suitable sliding gate valve 127 preferably arranged at the intake end of said chamber. Disposed in the chamber 125 in the path of the conditioned air is a conduit 128 through which liquid coolant is circulated for the condensation of dew thereon, whereby such conduit functions as a heat interchanger between the conditioned air and the coolant.

In order to increase the surface area of the conduit 128 the latter is formed as a helical coil, which may be extended lengthwise of the path of the air stream, or which may be divided into parallel sections disposed transversely of the path of the air stream, the latter construction being shown. The liquid coolant enters one end of said conduit through a regulating valve 129, by which the volume or rate of flow of the coolant through the conduit can be governed, depending upon conditions. The discharge end of the conduit 128 opens into one end of a receptacle or chamber 131, from the outlet end of which the liquid coolant is returned to the air conditioning apparatus. In the arrangement illustrated, we have shown the conduit 128 as being connected in a water circulating circuit with the water which is sluiced down over the refrigerating coils 31 being conducted to the dew-point sensing device through the pipe 87 and being returned to the sump 63 through the pipe 91, in substantially the same arrangement of circulating system described of the dew-point sensing devices illustrated in Figure 1. It will be understood, however, that the coolant may consist of any other liquid and may be derived from any other source of cold, as desired. Extending down into the coolant receptacle 131 is a thermally responsive element 132 which may be either of the liquid or thermal metal type. This thermally responsive element actuates an air valve or other control device 103, substantially as described of the construction shown in Figure 3.

To bring this out in more detail, it will be noted that the conduit 124 leading from delivery duct 14 corresponds to the conduit 93a of Figure 1, and that the return conduit 126 leading to the conditioning unit 12 corresponds to return conduit 95a of Figure 1. Also, the coil 128 is connected to the same coolant supply pipe 87 as the tube 86 is connected to in Figure 3, and the outlet pipe 91, leading from coil 128, corresponds to outlet pipe 91 leading from the receptacle 84 of Figure 3. Further, the expansion and contraction of member 132 acts upon the control means 103 in the same manner as the expansion and contraction of member 98 acts upon control member 103 of Figure 3. It is thus apparent that either the embodiment of Figure 3, or of Figures 4 and 5, can be embodied in the invention without any change in construction or function.

From this point, the control, whether exercised pneumatically or electrically, is performed substantially in the same manner as described of the preceding embodiment of dew-point sensing device.

The principle of operation of the present modified embodiment is to bring the coolant up to the dew-point temperature at the point where the coolant enters the receptacle 131 so that the temperature sensing effected by the thermally responsive element 132 will correspond substantially exactly with the dew-point temperature of the conditioned air. In order to give the conduit 128 the necessary area of heat transferring surface without necessitating an objectionably long length of conduit, and in order to give the temperature differential between the temperature of the coolant and the dry bulb temperature of the conditioned air an opportunity to raise the temperature of the coolant to the dew-point of the air, the conduit 128 is preferably constructed in the form of a tube having a relatively small bore and having closely spaced fins 134 of relatively large diameter radiating therefrom. It will be apparent that the tips or outer portions of said fins will have a temperature more closely approximating the dry bulb temperature of the air, and the surface of the tube proper and the inner portions of the fins will assume a temperature more closely approximating the temperature of the liquid coolant. To increase this temperature differential it may be desirable to construct the tube and fins of metals having different heat conductivities, such as, for example, copper for the tube and steel for the fins.

In the normal operation of the device the vapor content of the conditioned air will condense in a film of dew at dew-point temperature on what may be regarded as the prime surface of the conduit represented principally by the cylindrical outer walls of the tube and by the adjacent surface areas of the fins, whereas the outer portions of the fins will remain dry for effecting an interchange of heat between the dry bulb temperature of the air and the lower temperature of the coolant. The operation of the device, and the proportions desirable for obtaining this operation will be best understood by first considering certain factors entering into such operation and by assuming certain arbitrary values of temperature for illustrative purposes.

Three factors to be considered in obtaining a true dew-point sensing are: (1) The temperature of the dew or condensate formed; (2) the temperature of the liquid coolant to cause such condensation; and (3) the dry bulb temperature of the unsaturated air, the dew-point of which is to be sensed. These three factors all exert some influence on the heat transfer in the dew-point sensing device, and it is necessary or desirable to bring these three factors into a thermal balance at the dew-point temperatures for all ordinary variable conditions.

For operating conditions ordinarily encountered, the coolant conduit 128—134 is so proportioned in surface area of the fins, the diameter of the bore and conductivity of the metals employed in its construction, that when employing a liquid coolant having a temperature of not more than 15° below the dew-point temperature and when circulating conditioned air through the device having a dry bulb temperature of not more than 15° above the dew-point temperature, the tips or outer portions of the fins 134 will remain dry. With the device thus proportioned, the outer portions of the fins will remain dry for all temperature values below those above stated, represented, for example, by a coolant temperature of 10° below the dew-point temperature and a dry bulb air temperature of 10° above the dew-point temperature. The dry portions of the fins give the temperature differential existing between the coolant temperature and the dry bulb air temperature the opportunity to raise the temperature of the coolant during its extended passage through the tube 128. The tip areas of the fins provide effective surfaces for the transfer of heat from the air to the metal of the conduit, although it will be understood that this heat transfer is only a small part of the heat transfer from the dew formed at the dew-point temperature to the liquid coolant, approximating, roughly, one two-hundredth thereof.

By proportioning the area of outer fin surface to the prime surface approximately in the ratio of five to one and by providing a sufficient length of conduit to allow enough heat to pass from the sensible dry heat of the air to the tips of the fins to raise the liquid coolant from its original temperature to the dew-point temperature, predicated on a maximum temperature differential of 30° based on 15° maximum difference between the original coolant temperature and the dew-point temperature, the device can be calibrated so that the final temperature of the coolant in the receptacle 131 will accurately represent the dew-point temperature by adjusting the volume of air flow through the regulating gate valve 127 and by adjusting the rate or volume of coolant flow through the regulating valve 129. Once this calibration has been effected, the sensing device will function accurately for all differentials encountered between dew-point, coolant and dry bulb air temperatures, within the maximum values stated above, since the ratio of the difference between dry bulb air temperature and entering coolant temperature as against dew-point temperature and entering coolant temperature will be substantially constant with the present apparatus and the dehumidifier hereinbefore described. The device can be designed for any maximum conditions which may be encountered, being merely larger or otherwise proportioned for greater maxima than the assumed values above given.

In the calibration of the device, if the temperature sensed in the receptacle 131 is lower than the actual dew-point, the amount of coolant is decreased or the amount of air is increased, and conversely, if the sensed temperature is above the actual dew-point, the amount of air is decreased or the amount of coolant is increased, until the sensing is absolutely accurate. Due to the fact that the ratio of differential temperatures remains approximately the same for all practical values in ordinary air conditioning installations, the present sensing device, after being accurately calibrated, will function satisfactorily with fluctuating conditions.

Figures 7, 8:
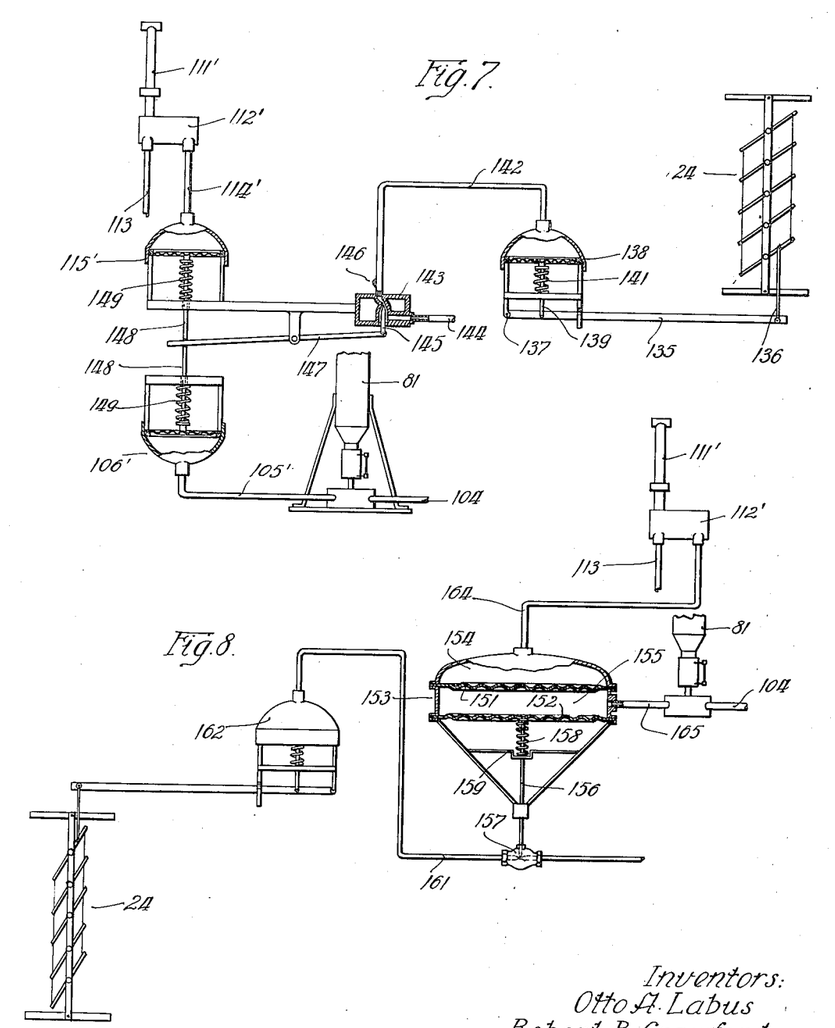
Figures 7 and 8 are diagrammatic views illustrating other constructions and arrangements of control mechanism.

In Figure 7 we have illustrated diagrammatically a modified arrangement of operating or control apparatus for regulating the by-pass damper 24, or for regulating such other apparatus as may be employed for controlling the conditioning of the air, such regulation being responsive to the dry bulb temperature sensing determined by the thermostat 111 and to the dew-point sensing as determined by the instrument 81 illustrated in Figures 1 and 3, or by the instrument 81' illustrated in Figures 4, 5 and 6. In this modified embodiment, a lever 135 is operatively connected by the link 136 to actuate the louvre damper 24, said lever being pivotally mounted at 137, as upon the frame of the single pneumatic motor unit 138 which actuates said lever, the latter being operatively connected to the diaphragm or piston element of the motor unit through the rod 139.

A spring 141 is suitably arranged to yieldingly oppose the pressure actuations of said motor unit. Extending from this pneumatic motor unit is an air pipe 142 which communicates with a control valve 143, the latter governing the admission of air under pressure from an air supply pipe 144 to the pipe 142. A needle valve 145 provides for fine regulation of the air pressure admitted to the pipe 142, there being a restricted leak 146 associated with the pipe 142 for maintaining a calibrated venting of the air supplied to the pneumatic motor 138. A lever 147 is operatively connected with the needle valve 145 and is arranged to be oscillated by two opposing stems or operating rods 148 extending from two pneumatic motors 106' and 115' acting in opposition to each other similarly to the pneumatic motors 106 and 115 of Figure 1. A spring 149 associated with each of these rods yieldingly opposes the pressure actuation of the diaphragm or piston in each of said pneumatic motors. Air ducts 105' and 114' extend from the motor units 106' and 115', respectively, and communicate with a dew-point sensing instrument either of the construction shown in Figure 3 or in Figures 4, 5 and 6, and with a dry bulb thermostat 111'. It will be evident that the two primary motor units 106' and 115' will respond to the dew-point and dry bulb temperature sensings and that the lever 147 will react to their differential, causing the needle valve 145 to be actuated appropriately for increasing or decreasing the rate of air supply to the secondary motor unit 138 and thereby governing the louvre damper 24 in accordance with the conditioning requirements of the system.

In Figure 8 we have illustrated still another modified form of operating or control mechanism for governing the louvre damper 24 or other regulating device in response to the dew-point sensing and to the dry bulb air temperature sensing. In this embodiment two diaphragms 151 and 152 are mounted in spaced relation in a housing 153 in such relation as to provide an upper diaphragm chamber 154 above the upper diaphragm 151 and a lower diaphragm chamber 155 between the two diaphragms 151 and 152. The lower diaphragm 152 is operatively connected with a rod 156 which by its movement actuates a valve element in a valve 157. A compression spring 158 surrounds the stem 156 between the diaphragm 152 and a fixed shoulder 159 for opposing the downward flexure of the diaphragm 152. The valve 157 controls the supply of air through pipe 161 to a pneumatic motor unit 162 which is arranged to actuate the louvre damper 24 for governing the operation of the air conditioning apparatus.

Extending from the upper diaphragm chamber 154 is a pipe 164 which leads to the dry bulb temperature sensing device 111'. The valve element of this sensing device is direct acting so that for a predetermined rise and fall of dry bulb temperature of the conditioned air a predetermined rise and fall in air pressure will be transmitted through the pipe 164 to the diaphragm chamber 154, it being understood that a calibrated orifice is associated either with the pipe 164 or chamber 154 for permitting a restricted venting of pressure to the atmosphere.

The lower diaphragm chamber 155 is connected through a pipe 165 with the dew-point sensing device 81. The control valve associated with this sensing device, which may be either of the construction shown in Figure 3 or the construction shown in Figures 4, 5 and 6, is arranged to be reverse acting so that with a rise in the dew-point a diminished air pressure will be transmitted through pipe 165 and with a fall in the dew-point an increased pressure will be transmitted through said pipe, the latter having a suitable calibrated vent associated therewith, as above described.

It will be seen that the actuation of the valve stem 156 is responsive to the sum of the two pressures prevailing in the upper and lower diaphragm chambers 154 and 155. The arrangement is such that as the sum of these pressures decreases the valve opens and as such sum increases the valve closes. The operating relation between the valve 157, pneumatic motor unit 162 and louvre damper 24 is such that when the valve 157 opens the damper also opens, and vice versa. Owing to the fact that the control valves of the two sensing devices operate reversely, as long as a predetermined temperature differential exists between dry bulb temperature and dew-point, air pressures of approximately the same aggregate sum will be effective on the valve stem 156.

That is to say, if with a given rise of dry bulb temperature the dew-point also rises proportionately, or, if with a given fall of dry bulb temperature the dew-point also falls proportionately, pressures of the same aggregate sum will be maintained in the two diaphragm chambers and there will be no resulting movement of the valve stem 156. If, however, the two sensed temperatures approach each other, either by lowering of the dry bulb temperature or raising of the dew-point temperature, or both, the sum of the effective pressures in the two diaphragm chambers will be diminished and in consequence the valve 157 will be opened and the louvre damper 24 will be opened, thereby permitting an increased volume of air to flow through the by-pass 23 around the conditioning chamber 22. Conversely, if the two sensed temperatures should separate either by a rise of the dry bulb temperature or a lowering of the dew-point temperature, or both, the sum of the pressures effective in the two diaphragm chambers will be increased, resulting in a closing actuation of the valve 156 and a closing of the louvre damper 24 for decreasing the air flow through the conditioning chamber by-pass 23. The approach of the two temperatures towards each other signifies that the dew-point is relatively high, representing an excessive humidity, and it will be seen that when this condition arises the louvre damper 24 is opened or assumes a more open position for permitting a larger proportion of the air to flow through the by-pass 23 for effecting a relative separation between the two temperatures.

Conversely, when the two temperatures separate it signifies a relative lowering of the dew-point, corresponding to an objectionably low humidity, and under this condition the louvre damper is closed for compelling a larger proportion of the air to be passed through the conditioning chamber 22 for causing the two temperatures to relatively approach each other. For ordinary operating conditions, it is desirable to maintain a differential of approximately 20° between the dry bulb temperature and the dew-point.

It will be seen from the foregoing that our invention comprehends different combinations and arrangements of control mechanism for regulating the operation of the air conditioning apparatus, based upon the principle of maintaining a predetermined differential between the dew-point sensing and the dry bulb sensing of the conditioned air. Our invention is, therefore, not to be limited to the specific forms of control apparatus hereinbefore described, nor to the specific construction of the air conditioning apparatus, since it will be evident that numerous changes and rearrangements may be made therein without departing from the essence of the invention. For example, instead of having the passageway 23 function merely as a by-pass, exerting no conditioning influence on the air passing therethrough, such passageway or chamber may be provided with conditioning apparatus therein constructed or adjusted to have a conditioning influence of greater or lesser degree than the apparatus in the chamber 22 so that the conditioning control is effected in the same manner as above described by relatively proportioning the air streams passing through the two chambers.

We claim:

1. In combination, air conditioning apparatus for conditioning a mixture of fresh and return air, said apparatus comprising means for introducing a mixture of fresh and return air into a conditioning unit, means for varying the humidity and temperature of a portion of said mixture, means for mixing said portion with a second portion of said mixture of different temperature and humidity for producing the conditioned air, a control element responsive to the temperature of moisture condensed from the conditioned air, a control element responsive to the dry bulb temperature of the conditioned air, and means differentially responsive to both of said control elements for regulating the relative proportions of said two portions.

2. In air conditioning apparatus, the combination of a conditioning chamber, spray means and refrigerator coils therein for reducing the humidity and temperature of the air stream passing through said chamber, a by-pass in shunt of said chamber, damper means controlling the relative proportions of the two air streams passing through said conditioning chamber and through said by-pass, said two air streams being mixed to produce an unsaturated conditioned air, means for washing the shunted air after it has passed through said by-pass, an instrument for sensing the temperature of moisture condensed from the unsaturated conditioned air, an instrument for sensing the dry bulb temperature of the conditioned air, and control means differentially responsive to both of said instruments for regulating said damper means.

3. In combination, air conditioning apparatus comprising regulatable means for governing the temperature and humidity of the conditioned air discharged from said apparatus a sensing device responsive to the temperature of moisture condensed from the discharged conditioned air, a sensing device responsive to the dry bulb temperature of the discharged conditioned air, a control device comprising two spaced diaphragms therein defining an outer diaphragm chamber and an intermediate diaphragm chamber between said diaphragms, valves actuated by said sensing devices and controlling the admission of air pressures to said diaphragm chambers, said valves operating reversely whereby rising dew-point and dry bulb temperatures effect an increase in pressure in one diaphragm chamber and a decrease in pressure in the other diaphragm chamber, and means responsive to the summation of the pressures in said chambers for governing said regulatable means.

4. The method of controlling the conditioning of air which comprises spraying water into the air, cooling the air, removing excess moisture from the air, discharging the conditioned air, entraining a portion of said discharged air, passing said portion over a surface cooled by said spray water, condensing moisture from said air sensing the temperature of said moisture, and controlling the spraying of water into the air in accordance with said temperature sensing.

5. The method of controlling the conditioning of air which comprises spraying water into a portion of said air, by-passing the other portion of said air, cleaning the mixture of air after it has passed the by-pass, removing excess moisture from the air, discharging the conditioned air into a delivery duct, entraining a portion of said discharged air, condensing moisture therefrom by passing said portion over a surface cooled by said spray water, sensing the temperature of said moisture, and controlling the quantity of air by-passed in accordance with said temperature sensing.

6. The method of controlling the conditioning of air which comprises spraying water into a portion of the air, by-passing the other portion of the air, washing and cleaning the mixture of air after it has passed the by-pass, removing excess moisture from the air, discharging the conditioned air into a delivery duct, entraining a portion of said discharged air, condensing moisture therefrom by passing said portion over surfaces cooled by said spray water, sensing the temperature of said condensate, controlling the spraying of water into said air in accordance with said temperature sensing, and controlling the portion of air by-passed in accordance with said temperature sensing.

7. The method of controlling the conditioning of air which comprises spraying water into a portion of the air, by-passing a second portion of the air, washing and cleaning the entire portion of the air after it has again been remixed, removing excess moisture from the air, discharging the conditioned air into a delivery duct, entraining a portion of said discharged air, condensing moisture therefrom by passing said portion over a surface cooled by said spray water, sensing the temperature of said moisture, sensing the dry bulb temperature of said conditioned air, and controlling the portion of air by-passed about said spray water by the differential existing between said moisture temperature sensing and said dry bulb temperature sensing.

8. The combination in an air conditioning system including a conditioning chamber to which air is passed, spraying means for adding moisture to said air, dehumidifying means, and means for discharging said air into a delivery duct, of means for sensing the dew point of said discharged air comprising a surface cooled by said spraying means, means for conducting a portion of said discharged air past said surface, and thermally sensitive means responsive to the temperature of the condensate formed on said surface for operating suitable means to control the spraying means in accordance with the dew point sensing.

9. The combination in an air conditioning system including a conditioning chamber to which air is passed, spraying means for adding moisture to said air, dehumidifying means, and means for discharging said air into a delivery duct, of means for controlling the spraying means in accordance with the temperature of moisture condensed from said discharged air comprising a surface cooled by circulation of said spraying means therethrough, said surface comprising an extended length of tubing provided with radially projecting fins, means for conducting a portion of said discharged air past said surface to condense moisture thereon, and thermally sensitive means responsive to the temperature of the circulated spraying means for operating said control means.

10. The combination in an air conditioning system including a conditioning chamber to which air is passed, spraying means for adding moisture to said air, dehumidifying means, and means for discharging said air into a delivery duct, of means for controlling the spraying means in accordance with the temperature of moisture condensed from said discharged air comprising a tubing containing a liquid coolant, means for controlling the flow of coolant within said tubing, means for conducting a portion of said discharged air past said surface to condense moisture thereon, and thermally sensitive means adapted to come into contact with the coolant flowing through said tubing and responsive to the temperature of the coolant for operating said control means.

11. Apparatus for conditioning air comprising a conditioning chamber to which the air is passed, means associated with said chamber for spraying water into the air, means for sensing the temperature of moisture condensed from the conditioned air including a receptacle containing a coolant, means for conducting a portion of the conditioned air past said receptacle for causing dew to collect on said receptacle, and means connected to and actuated by said temperature sensing means for controlling the water spraying means.

12. Apparatus for conditioning air comprising a conditioning chamber to which the air is passed, regulatable means associated therewith for varying the condition of said air, means for sensing the dry bulb temperature of the conditioned air, means for sensing the temperature of moisture condensed from the conditioned air including a receptacle containing a coolant, means for conducting a portion of said conditioned air past said receptacle for causing dew to collect on said receptacle, means for sensing the temperature of said dew, and thermally sensitive means responsive differentially to said dry bulb temperature sensing means and to said dew point temperature sensing means for controlling said regulatable means.

13. In an air conditioning apparatus, the combination of a conditioning chamber, means for conditioning the air within said chamber, a control means, means for leading at least a portion of the conditioned air in affecting relation to said control means, means associated with said control means for effecting the dew point temperature of the said conditioned air, means also associated with said control means responsive to the temperature of the resulting dew for effecting the said conditioning means.

OTTO A. LABUS.
ROBERT B. P. CRAWFORD.